United States Patent
Richardson et al.

(10) Patent No.: US 8,665,350 B2
(45) Date of Patent: Mar. 4, 2014

(54) METHOD FOR FIXED PATTERN NOISE (FPN) CORRECTION

(75) Inventors: John Richardson, Newbury Park, CA (US); John Wallner, Calabasas, CA (US)

(73) Assignee: AltaSens, Inc., Westlake Village, CA (US)

( * ) Notice: Subject to any disclaimer, the term of this patent is extended or adjusted under 35 U.S.C. 154(b) by 1223 days.

(21) Appl. No.: 12/151,833

(22) Filed: May 8, 2008

(65) Prior Publication Data

US 2009/0278962 A1    Nov. 12, 2009

(51) Int. Cl.
*H04N 9/64* (2006.01)

(52) U.S. Cl.
USPC .......................... 348/241; 348/243; 348/251

(58) Field of Classification Search
USPC ......................................................... 348/241
See application file for complete search history.

(56) References Cited

U.S. PATENT DOCUMENTS

| | | | |
|---|---|---|---|
| 3,067,283 A | 12/1962 | Petritz et al. | |
| 3,949,162 A | 4/1976 | Malueg | |
| 4,678,938 A | 7/1987 | Nakamura | |
| 4,839,729 A | 6/1989 | Ando et al. | |
| 5,892,540 A | 4/1999 | Kozlowski et al. | |
| 6,753,913 B1 | 6/2004 | Bilhan et al. | |
| 6,788,340 B1 | 9/2004 | Chen et al. | |
| 7,098,950 B2 | 8/2006 | Yamamoto et al. | |
| 2002/0033891 A1 | 3/2002 | Ying et al. | |
| 2006/0044424 A1* | 3/2006 | Shirai et al. | 348/241 |

FOREIGN PATENT DOCUMENTS

| | | |
|---|---|---|
| JP | 04-310072 | 11/1992 |
| JP | 10-285432 | 10/1998 |
| JP | 2003-209713 | 7/2003 |
| JP | 2003-348376 | 12/2003 |
| JP | 2005-101985 | 4/2005 |
| JP | 2006-025146 | 1/2006 |
| JP | 2006-074172 | 3/2006 |
| JP | 2006-157242 | 6/2006 |
| JP | 2007-194899 | 8/2007 |

OTHER PUBLICATIONS

Search Report.

* cited by examiner

*Primary Examiner* — Joel Fosselman
(74) *Attorney, Agent, or Firm* — Reed Smith LLP

(57) ABSTRACT

A method for correcting column Fixed Pattern Noise (FPN) in an image sensor offers a compromise between speed and precision for calculating column FPN offsets. The present correction technique is digital, and is applied after the pixel signal voltages have been digitized by an ADC. A first Optical Black (OB) pixel is sampled and compared to a target level. An offset is stored, and an appropriate push-size is determined. Additional OB pixels are sampled and the offset is applied. The push-size is increased or decreased depending upon whether the pixel signal with the applied offset is above or below a target value. This new offset value is written to memory, and the push-size is reduced, and the process is repeated until the last OB pixel has been processed. The resulting offset is applied to the signal pixels in a column. The primary advantage of this approach is that within a single frame, a good estimate of the column offset is made which is not as affected by outlier pixels (such as "hot" or "flashing" pixels).

7 Claims, 5 Drawing Sheets

| OB Row # | OB Video | Memory Content | Corrected Video | Decision | Push Magnitude |
|---|---|---|---|---|---|
| 1 | 70 | N/A | N/A | Write -6 | N/A |
| 2 | 68 | -6 | 62 | Push Up | 4 |
| 3 | 72 | -2 | 70 | Push Down | 2 |
| 4 | 69 | -4 | 65 | Push Down | 1 |
| 5 | 73 | -5 | 68 | Push Down | 0.5 |
| 6 | 70 | -5.5 | 64 | No Change | 0.25 |
| 7 | 69 | -5.5 | 63 | Push Up | 0.25 |
| 8 | 73 | -5.25 | 67 | Push Down | 0.25 |

METHOD FOR FIXED PATTERN NOISE (FPN) CORRECTION

BACKGROUND OF THE INVENTION

1. Field of the Invention

The present invention relates generally to image sensors, and specifically to a method for correcting column fixed pattern noise (FPN) in CMOS image sensors.

2. Description of the Related Art

Visible imaging systems implemented using CMOS image sensors reduce camera noise, cost and power while simultaneously improving resolution and capture rate. The most advanced and highest performance cameras use CMOS imaging System-on-Chip (iSoC) sensors that efficiently couple low-noise image detection and processing by using various supporting blocks integrated on a single chip.

On the other hand, CMOS iSoC's are prone to producing image artifacts that are by-products of the specific analog readout architecture used to capture the image. A common example of one such image artifact is column Fixed Pattern Noise (FPN), which arises when each column of pixels has a different fixed offset. When the peak-to-peak variation of such offsets is sufficiently high so as to make the columns visible in the still or video image, steps must be taken to correct it since column FPN can be most evident at nominal gain. Other artifacts include row FPN and pixel-to-pixel FPN; these can be similarly generated by amplifier offsets, but can also be created by the process of sampling reference noise at different times for each pixel or row. Pixel-to-pixel and row FPN are particularly evident in low light conditions wherein maximum sensor gain is necessary.

Various techniques are used to correct FPN in both the analog circuits located throughout the sensor's signal chain and in the downstream digital circuitry. In the latter case, the downstream circuits can be on-chip or off-chip, i.e., in the downstream camera electronics. An early example of an image sensor that used an external differential amplifier to subtract the stored FPN data from the two-dimensional sensor's video output is taught in U.S. Pat. No. 3,067,283.

Other prior art instead integrated FPN suppression in the iSoC by either analog or digital means. U.S. Pat. No. 5,892,540, for example, teaches a self-correcting column buffer that actively suppresses column offsets in the analog domain to the order of tens of microvolts as each pixel is read out at each column. While this methodology corrects each column buffer's dc offset, it does not correct offsets generated later in the signal processing chain. Nevertheless, the '540 patent improved on earlier FPN compensation methods that first determined FPN in the absence of the light, stored the offset terms, and then compensated for FPN while generating the video stream, such as both the '283 patent and U.S. Pat. No. 3,949,162. The '162 patent corrects the offsets in the analog domain after digitally acquiring the data.

It was determined that it is necessary to include dedicated optically black (OB) pixels (pixels shielded from light pickup) in the image sensor and that these should be located in the periphery surrounding the light-sensing area. OB pixels are useful to optimize black clamping and to properly facilitate fixed pattern noise compensation. U.S. Pat. No. 4,678,938 hence teaches column-wise and row-wise embodiments for reading OB pixels in a feedback-controlled manner to dynamically eliminate offsets in each column or row. U.S. Pat. No. 4,839,729 later improves the efficacy of the '938 patent by instead reading each line of active video at the same time as a stored line of OB video and using the differential amplifier scheme pioneered in the '283 patent to eliminate FPN. U.S. Pat. No. 6,788,340, later combined the various cited and other prior art to teach an integrated solution that could be included in a single iSoC. The '340 patent specifically combines optically black pixels, which are located at the periphery of the image sensor, with a digital controller and differential programmable gain amplifier 24. Nevertheless, the '340 patent does not teach specific means and an effective algorithm for correcting FPN. Instead, the focus of the '340 patent is to enable dynamic adjustment of the video to always use the largest possible ADC range and to optimize image brightness. U.S. Pat. No. 7,098,950 later improved on black clamp operation by not including defective pixels.

Column Fixed Pattern Noise offsets are determined in the present invention by estimating the specific column FPN using a set of optically black calibration pixels (OB pixels) within each column. However, there are several factors that can influence the effectiveness of FPN determination. Factors degrading efficacy include the amount of temporal noise in the OB pixels, the presence of random individual pixel offsets (pixel FPN), the quantity of available OB pixels per column, and the digital precision of the correction. These factors are mitigated by the present invention.

In calculating the column offsets, the influence of pixel temporal noise is eliminated by using a push-up/push-down approach in which small incremental adjustments are continuously made. Depending on the magnitude of the adjustment, this offers the most precise offset calculation, since the temporal noise is effectively filtered out. However, depending on how large the offset variations are, and on the number of available OB samples there are in each frame, it can take a long time (many frames) for this method to converge. Furthermore, video imaging systems usually incorporate some kind of dynamic gain adjustment so that the response of the sensor can be continuously adjusted to suit the scene conditions. The calculated column offsets may, depending on the readout architecture, become invalid by such gain adjustments, thereby requiring continual re-calculation.

In order to have a correction value that is always valid, an alternative approach is to take an average of the OB pixels within each column and perform a new calculation for each frame. In this case, the temporal noise has more influence on the precision of the calculation. Furthermore, the mean may be adversely affected by a few outlier pixels, i.e. pixels not falling within a Gaussian distribution of pixel offset, or those not adhering to a Gaussian temporal distribution themselves.

Understanding these drawbacks and limitations, the present invention teaches a method for quickly converging to the correct offsets to eliminate column FPN in the presence of other pattern noise, temporal noise, and flicker noise.

SUMMARY OF THE INVENTION

In general, the present invention is a method of column Fixed Pattern Noise (FPN) correction, which is a technique for quickly determining offset noise in an imaging sensor from a data stream including optically black pixels. Convergence speed is enhanced by iteratively converging on the optimal amount of push-up or push-down required to match the actual offset.

In one embodiment, the method comprises sampling a first optical black (OB) pixel level; calculating a difference between the first OB pixel level and a target level; storing the difference in a memory as an offset; setting a push size; sampling a next OB pixel level; reading the offset from memory; applying the offset to the next OB pixel level to form a modified next OB pixel level; determining whether the modified next OB pixel level is above or below the target level; wherein if the modified next OB pixel level is above the target level, then the offset value is pushed down by a push-size and written to memory; or wherein if the modified next OB pixel is below the target level, then the offset value is pushed up by a push-size and written to memory; comparing the push-size with a minimum step size; if the push-size is larger than the minimum step size, then reducing the push-size; and determining whether a last OB pixel has been sampled, and if not, then repeating sampling a next OB pixel.

The method may further comprise, after determining that a last OB pixel has not been sampled, repeating the steps of: sampling a next OB pixel level; reading the offset from memory; applying the offset to the next OB pixel level to form a modified next OB pixel level; determining whether the modified next OB pixel level is above or below the target level; wherein if the modified next OB pixel level is above the target level, then the offset value is pushed down by a push-size and written to memory; or if the modified next OB pixel is below the target level, then the offset value is pushed up by a push-size and written to memory; comparing the push-size with a minimum step size; wherein if the push-size is larger than the minimum step size, then reducing the push-size; and determining whether a last OB pixel has been sampled.

The target level can be calculated by averaging OB pixels at a beginning of a line, which have not had any column fixed pattern noise correction applied. The step of setting a push-size may comprise setting the push-size to a significance parameter, wherein the significance parameter is set in proportion to the average uncertainty of a first direct offset estimate. If the push-size is larger than the minimum step size, then the push-size is divided by two. After a last OB pixel has been sampled, an offset value in memory is applied to each signal pixel in a column. Also, the significance parameter may be scaled based on a gain setting.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

Figure 1:
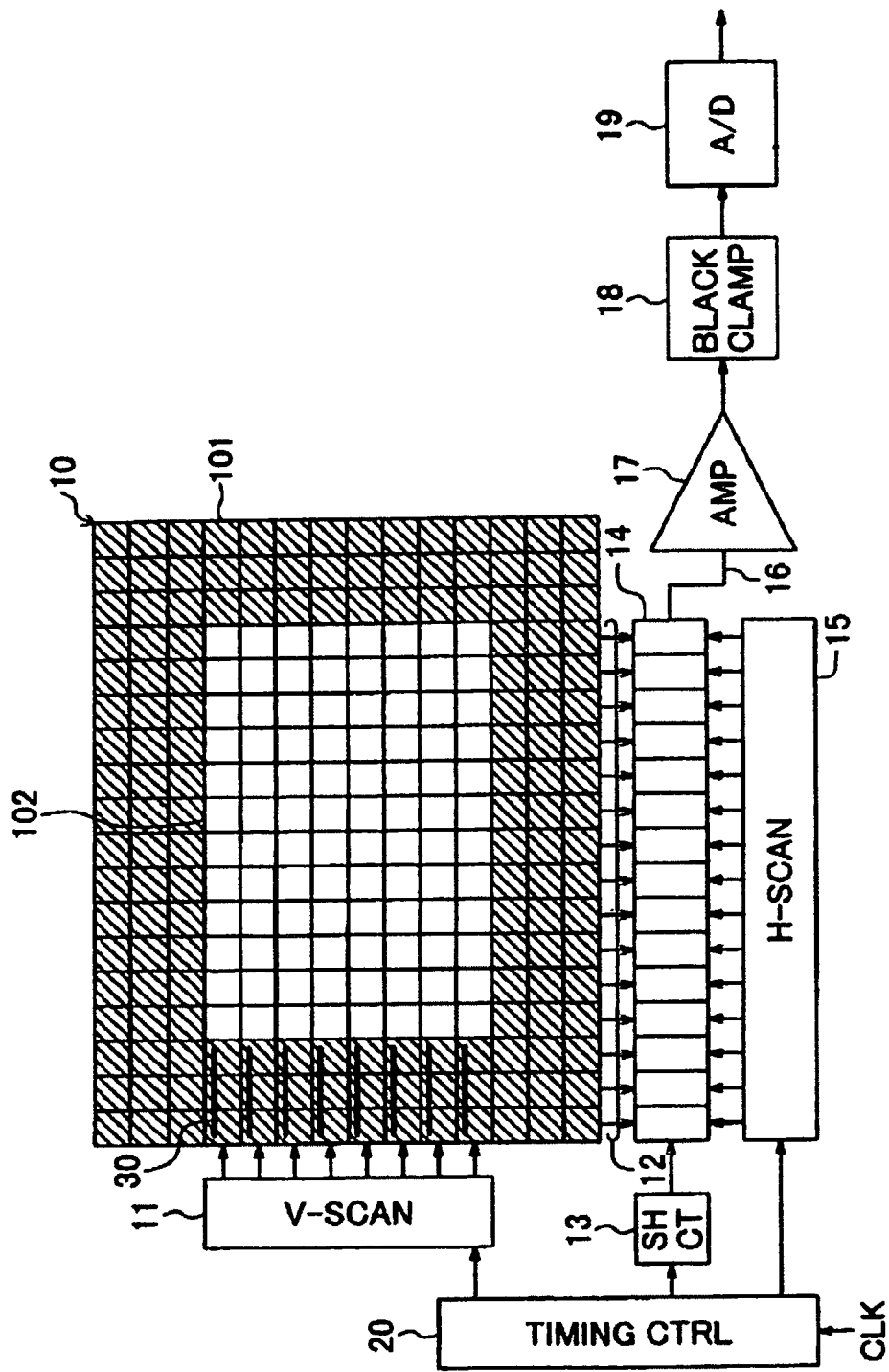
FIG. 1 is a block diagram of an image sensor of the prior art, U.S. Pat. No. 7,098,950, consisting of an imaging array, optical black pixels, multiplexing logic, black clamp circuit and A/D converter.

The present invention offers a compromise between speed and precision for calculating column Fixed Pattern Noise (FPN) offsets in an imaging System-on-Chip (iSoC) sensor configured as shown, for example, in FIG. 1 from U.S. Pat. No. 7,098,950. The present correction technique is digital, and is applied after the pixel signal voltages have been digitized by an ADC (analog to digital converter).

Figure 2:
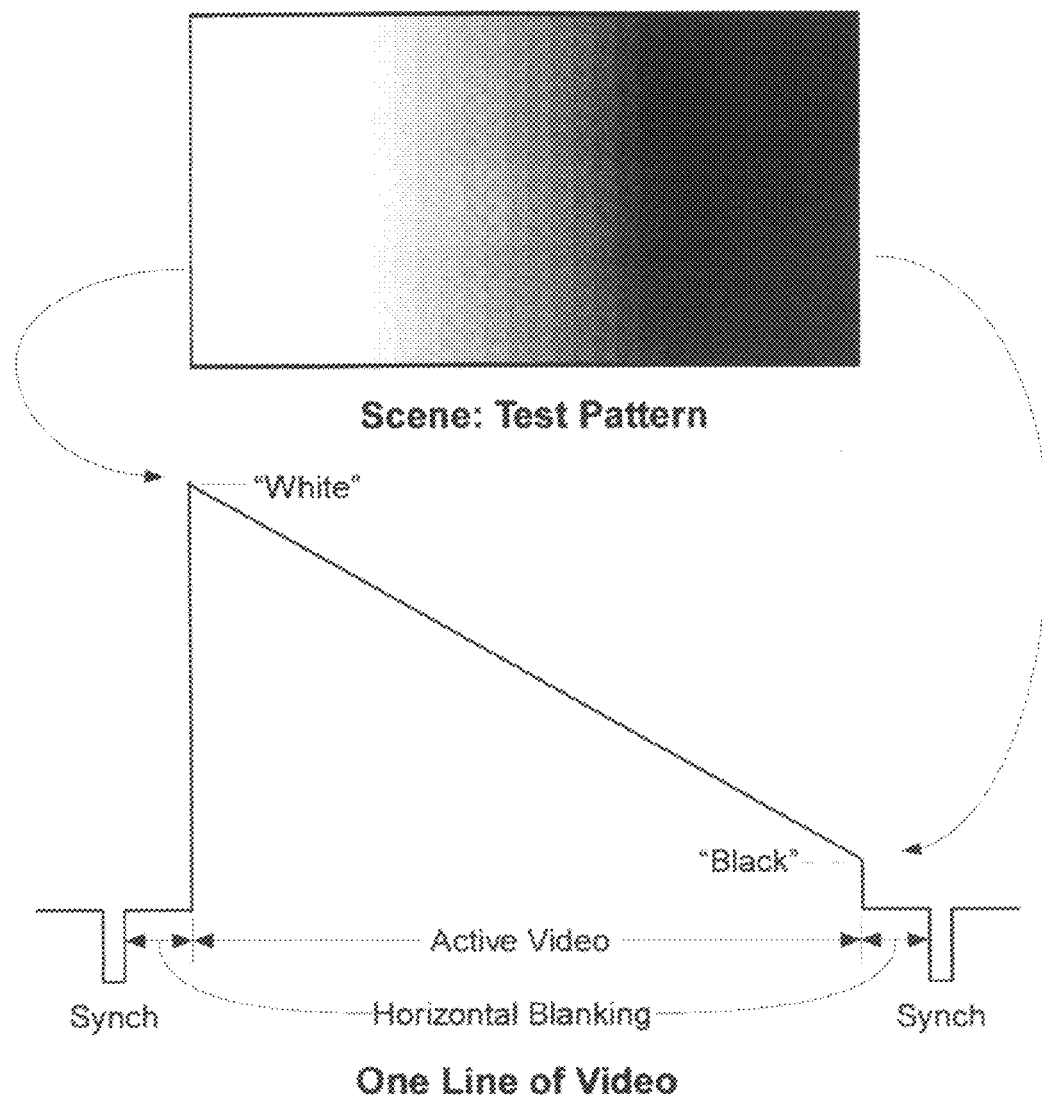
FIG. 2 is an illustration of a typical image sensor showing how scene content is converted to a line of video corresponding to the scene content.
Figure 3:
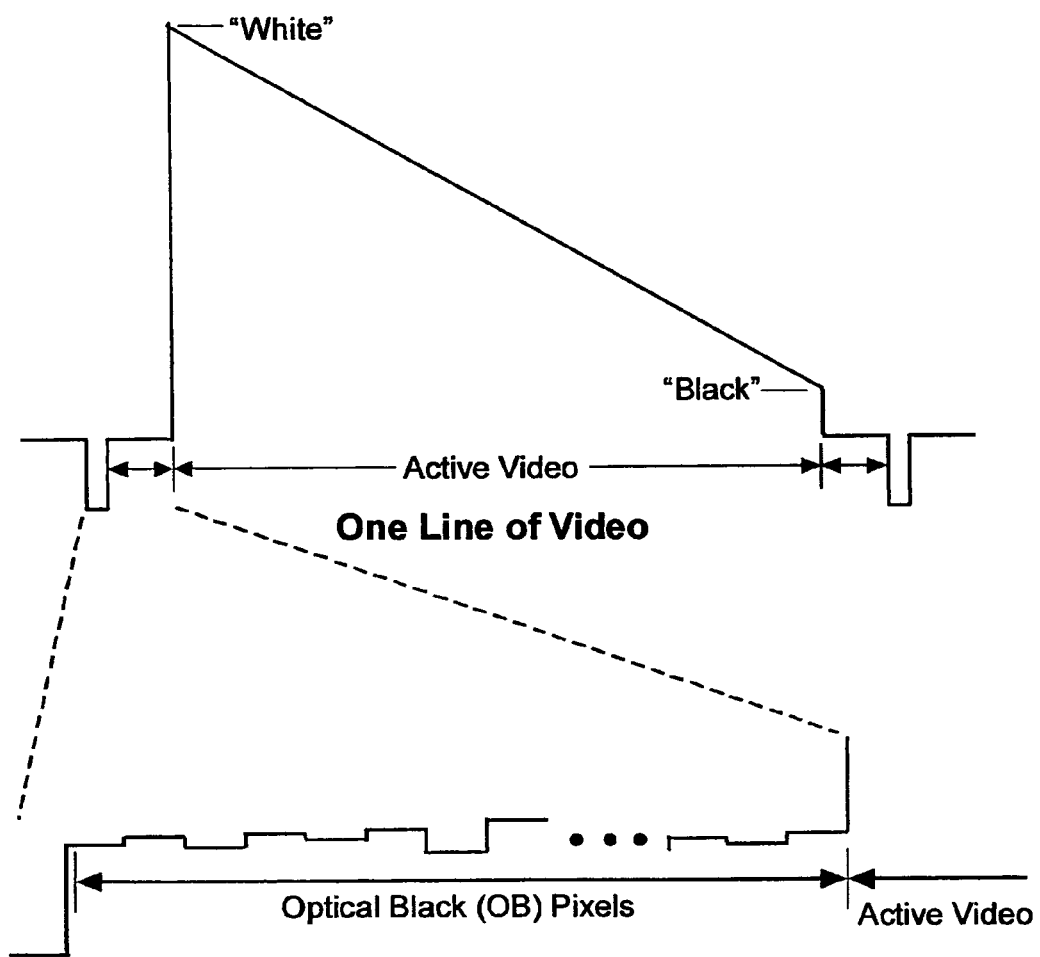
FIG. 3 includes a magnified view of the "front porch" blanking interval wherein the optically black pixels are read prior to reading active video.

Each line of analog video generated either within an iSoC or supplied by an imaging sensor with analog output is typically formed as shown in FIG. 2. A representative image consisting of gray-level information spanning white to black form a line of video resembling a sawtooth. On both sides of the active video are synchronization pulses and video blanking signals. The timing duration of the video blanking intervals depends on the actual video standard. Appropriate standards currently used include the NTSC and ATSC standards. Those skilled in the art appreciate, however, that optical black pixels can be read during the blanking intervals in order to perform various functions including black clamping and FPN correction. FIG. 3, for example, shows a series of OB pixel that read during the so-called "front porch" blanking interval to perform the column FPN compensation of the present invention.

Figures 4, 6:
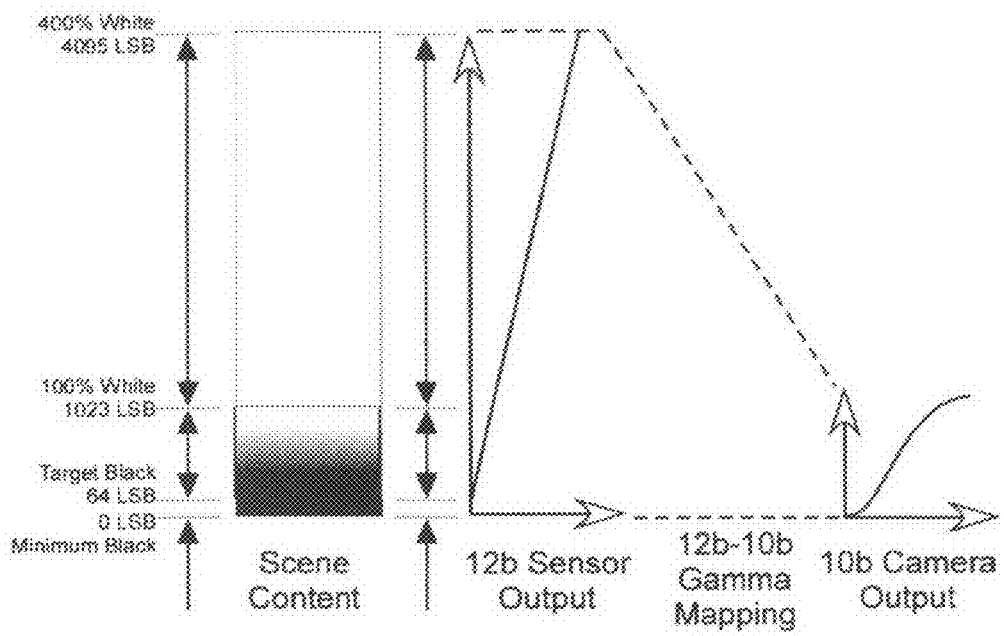
FIG. 4 is a sequence of graphs showing how gray levels spanning black through successive intensities of white are first linearly converted to least significant bits in the sensor and mapped into fewer bits in a typical video camera.
FIG. 6 is a table containing an example of the convergence process achieved by the present invention wherein offset errors are tapered to a minimum error corresponding to the minimum step size.

FIG. 4 illustrates how scene information is converted by an iSoC into corresponding digital values. In a typical imaging system, a target level is selected for the desired black level that is above the minimum absolute black level that can be handled by the sensor, e.g., zero. Setting the target above the absolute minimum helps preclude black-level clipping regardless of sensor illumination, sensor noise, sensor operating temperature or sensor setup including gain, exposure time and other variable settings well known to those skilled in the art. In a 12-bit imaging system there are 4096 possible values, or least significant bits (LSB). The 4096 possible LSBs hence span signal intensities from full-black (0 LSB) to maximum white (4095 LSB). In such sensors, the target black level is often set to 64 LSB to help flawlessly accommodate dispersion in the black level stemming from temporal and spatial noise regardless of sensor gain. Assuming that the noise spans only 1 LSB from peak-to-peak, sensor gain can be increased to 64 without having the largest variations in the black level clip at a level that is blacker than full-black (0 LSB). On the other hand, peak-to-peak noise spanning 8 LSB's limits useful gain to eight (18 dB). This is compatible with the minimum specification since camera designers typically require that the image sensor support gain of at least 18 dB while supplying a stable, high-quality black level. The target level may hence be set to a value other than 64 to facilitate high-quality black level processing regardless of gain setting for dynamic imaging conditions wherein the lighting spans bright, standard, and low levels of illumination. Further, the target can simply be the average of the OB pixels.

FIG. 4 also shows that the sensor typically converts the various scene intensities in a linear manner. The typical video camera, however, applies gamma conversion to the linear data to map the video into a compressed signal. Here the 4096 LSBs, i.e., 12 bits, of sensor data are converted into 10 bits of camera video.

Figure 5:
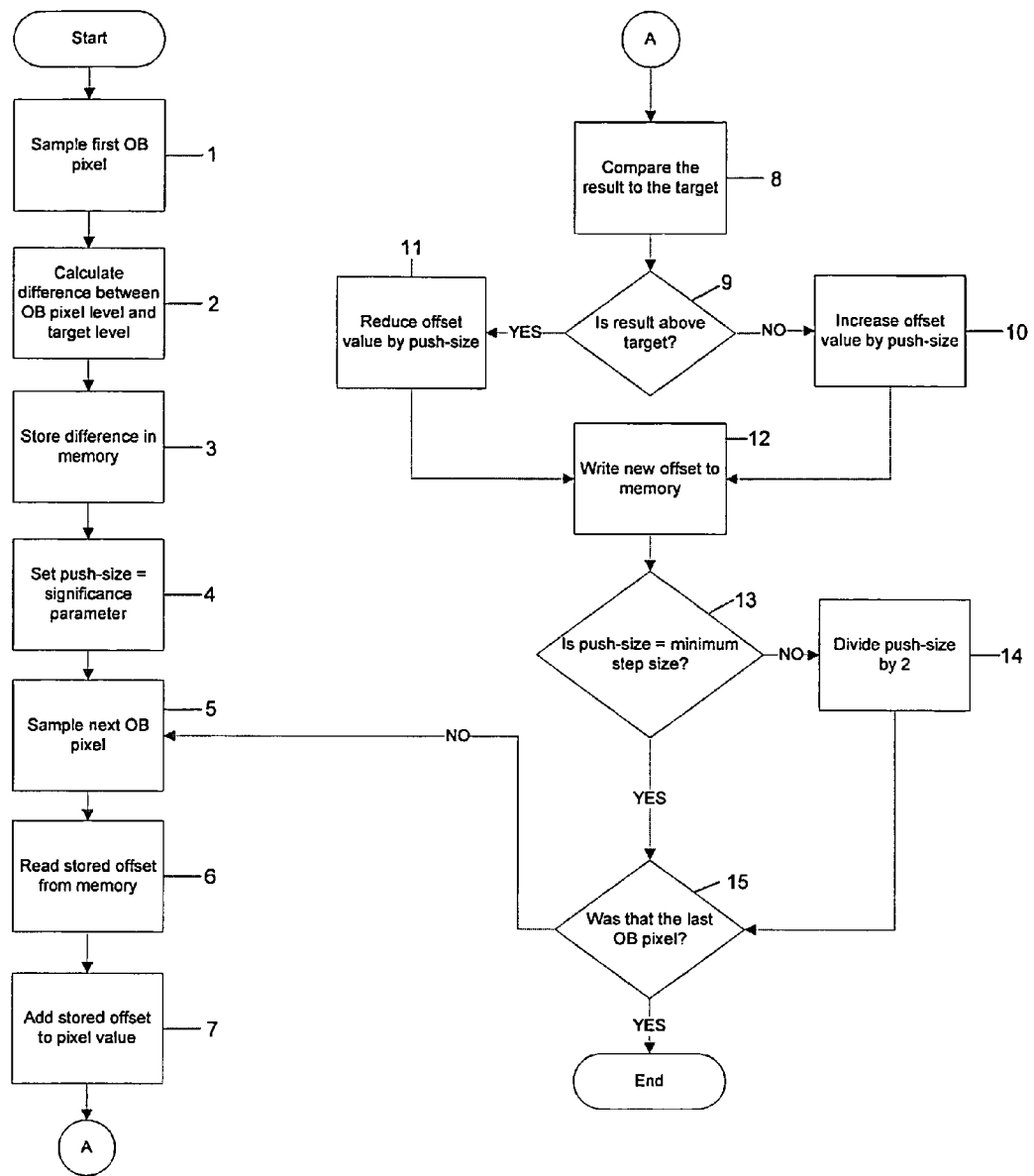
FIG. 5 is a flow-chart illustrating how column FPN offsets are determined in the present invention using the digitized data supplied by the sensor's A/D converter.

FIG. 5 illustrates a signal-processing flowchart according to one embodiment of the invention. The optical black (OB) pixels are read, sampled, and the black level determined prior to reading the clear (light sensitive) signal pixels within each column. For each column, a first OB pixel is sampled (step 1). A difference between the OB pixel level and a target pixel level is calculated (step 2). The target level is optionally set to either the average of a line, or to a register programmable constant. The line average is computed using a subset of OB pixels at the start of the line. This subset of OB pixels does not receive the column FPN correction. The difference between the OB pixel level and the target level is stored in memory (step 3). At this point, the values which reside in memory for the offsets have an associated error which is primarily due to the individual offset of that pixel (the pixel FPN), plus the temporal noise of that pixel.

The initial push-size is set to the significance parameter (described below). (step 4). The next OB pixel is then sampled (step 5), and the offset is read from memory (step 6). The offset is then added to the current OB pixel value (the offset is a signed value) (step 7).

This modified value is again compared to the target (step 8) and a decision is made as to whether the modified value is above or below the target value (step 9). If the offset value is below the target value, then the offset value is increased by the push-size (step 10), otherwise the offset value is decreased by the push-size (step 11). The new offset estimate is then written back to the memory (step 12).

The push-size is then compared with a minimum push-size (step 13). If the push-size is not equal to the minimum push-size, then the push-size is divided by two (step 14). If there are still more OB pixels to sample, (step 15), then the process repeats (step 5) for subsequent OB pixel samples with the push-size being progressively reduced until the minimal increment is reached (corresponding to the least significant bit of the memory).

The magnitude of the first step size (i.e. the push size which operates on the second OB sample) is referred to as the significance. The significance should be tuned in proportion to the average uncertainty of the first direct offset estimate. The greater the error in the first estimate, the greater the significance must be to neutralize the initial error. The significance is scaled in proportion to the sensor's gain setting so that it is scaled proportionally to the average uncertainty. Quantitatively, the mean error, $\overline{Error_{offset}}$, in calculating the FPN offsets after the first OB sample is equal to the quadratic sum of the pixel FPN, $N_{FPN}$, and the pixel temporal noise, $N_{temporal}$, in digital units (assuming well-behaved Gaussian errors).

$$\overline{Error_{offSet}} = \sqrt{N_{temporal}^2 + N_{FPN}^2}$$

In practice, the optimal significance is set empirically for a particular gain, and it is scaled accordingly for each gain setting.

Changing the gain in the analog domain will change the magnitude of this number therefore the initial step size is a tunable, gain—dependent parameter. For simplicity of implementation, the reduction in push-size for each OB sample is a factor of two (i.e. a one shift to the right).

The process of making a direct write to the column offset memory, then pushing up and down on this value by a progressively smaller amount is referred to as a "tapering" process. For subsequent frames, the offsets are continuously pushed up or down by the minimal push-size until an event occurs (such as a change in gain) which merits new column offset calculations. Then, the tapering process is either automatically or manually triggered again.

FIG. 6 is table illustrating an example of the tapering process. In this example, the significance is tuned to four digital counts and the memory Least Significant Bit (LSB) is equal to ¼ of the ADC LSB, which digitized the pixel voltage. The target level is 64 counts.

The primary advantage of this approach is that within a single frame, a good estimate of the column offset is made which, unlike the average, is not as affected by outlier pixels (such as "hot" pixels having excess dark current compared to the mean, or "flashing" pixels having random telegraph noise that causes their levels to have relatively large positive and negative offsets). If an outlier OB pixel occurs early in the tapering process, a large push is made, the sign of which will be wrong 50% of the time. Since the push is not proportional, the remaining pushes within the taper (the sum of which is almost equal to the errant push) provide a recovery. If an outlier pixel effect occurs late in the tapering process, again the push may be in the wrong direction, but now the magnitude is inconsequential. Ultimately, after several frames of minimal pushes, the temporal noise is completely filtered out. Therefore, the technique still has the asymptotic accuracy of the continuous minimal push approach. Since the first OB pixel results in a direct, proportional write to memory, provision is made for the situation of the OB pixel being an outlier. For example, the option to utilize an alternative row of OB pixels for the sample may be provided.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A method of column Fixed Pattern Noise (FPN) correction, the method comprising:
   sampling a first optical black (OB) pixel level;
   calculating a difference between the first OB pixel level and a target level;
   storing the difference in a memory as an offset;
   setting a push size;
   sampling a next OB pixel level;
   reading the offset from memory;
   applying the offset to the next OB pixel level to form a modified next OB pixel level;
   determining whether the modified next OB pixel level is above or below the target level;
   if the modified next OB pixel level is above the target level, then the offset value is pushed down by a push-size and written to memory;
   if the modified next OB pixel is below the target level, then the offset value is pushed up by a push-size and written to memory;
   comparing the push-size with a minimum step size;
   if the push-size is larger than the minimum step size, then reducing the push-size; and determining whether a last OB pixel has been sampled, and if not, then repeating sampling a next OB pixel.

2. The method of claim 1, wherein the target level is calculated by averaging OB pixels at a beginning of a line, which have not had any column fixed pattern noise correction applied.

3. The method of claim 1, wherein the step of setting a push-size comprises setting the push-size to a significance parameter, wherein the significance parameter is set in proportion to the average uncertainty of a first direct offset estimate.

4. The method of claim 1, wherein if the push-size is larger than the minimum step size, then the push-size is divided by two.

5. The method of claim 1, wherein after a last OB pixel has been sampled, an offset value in memory is applied to each signal pixel in a column.

6. The method of claim 3, wherein the significance parameter is scaled based on a gain setting.

7. The method of claim 1, further comprising:
after determining that a last OB pixel has not been sampled, repeating the steps of:
sampling a next OB pixel level;
reading the offset from memory;
applying the offset to the next OB pixel level to form a modified next OB pixel level;
determining whether the modified next OB pixel level is above or below the target level;
if the modified next OB pixel level is above the target level, then the offset value is pushed down by a push-size and written to memory;
if the modified next OB pixel is below the target level, then the offset value is pushed up by a push-size and written to memory;
comparing the push-size with a minimum step size;
if the push-size is larger than the minimum step size, then reducing the push-size; and
determining whether a last OB pixel has been sampled.

* * * * *